(12) United States Patent
Hapsari et al.

(10) Patent No.: US 8,614,987 B2
(45) Date of Patent: Dec. 24, 2013

(54) LOCATION INFORMATION ACQUISITION METHOD AND MOBILE STATION

(75) Inventors: Wuri Andarmawanti Hapsari, Yokosuka (JP); Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 358 days.

(21) Appl. No.: 12/866,615

(22) PCT Filed: Feb. 6, 2009

(86) PCT No.: PCT/JP2009/052104
§ 371 (c)(1),
(2), (4) Date: Oct. 13, 2010

(87) PCT Pub. No.: WO2009/099215
PCT Pub. Date: Aug. 13, 2009

(65) Prior Publication Data
US 2011/0026486 A1 Feb. 3, 2011

(30) Foreign Application Priority Data
Feb. 8, 2008 (JP) ................................. 2008-029719

(51) Int. Cl.
H04W 4/00 (2009.01)
H04B 7/216 (2006.01)

(52) U.S. Cl.
USPC ............................ 370/331; 370/328; 370/325

(58) Field of Classification Search
None
See application file for complete search history.

(56) References Cited

U.S. PATENT DOCUMENTS

| | | | |
|---|---|---|---|
| 6,449,482 B1 | 9/2002 | Johansson et al. | |
| 6,859,654 B1 | 2/2005 | Reynolds et al. | |
| 2002/0160785 A1 * | 10/2002 | Ovesjo et al. | 455/453 |
| 2005/0202780 A1 * | 9/2005 | Kall et al. | 455/1 |
| 2007/0096981 A1 * | 5/2007 | Abraham | 342/357.15 |
| 2007/0178908 A1 * | 8/2007 | Doyle | 455/456.1 |
| 2009/0191862 A1 * | 7/2009 | Amirijoo et al. | 455/424 |

FOREIGN PATENT DOCUMENTS

| | | |
|---|---|---|
| CN | 1191059 A | 8/1998 |
| CN | 1286006 A | 2/2001 |
| JP | 11-505980 A | 5/1999 |
| JP | 2002-509407 A | 3/2002 |
| JP | 2003-47033 A | 2/2003 |

OTHER PUBLICATIONS

International Search Report w/translation from PCT/JP2009/052104 dated Apr. 14, 2009 (4 pages).

(Continued)

Primary Examiner — Faruk Hamza
Assistant Examiner — Diane Lo
(74) Attorney, Agent, or Firm — Osha Liang LLP

(57) ABSTRACT

A mobile communication method includes the steps of: transmitting, from a first radio base station (S-eNB) to the mobile station (UE) communicating via a first cell under control of the first radio base station (S-eNB), a handover command instructing to perform handover to a second cell under control of a second radio base station (T-eNB); performing, at the mobile station (UE), handover from the first cell to the second cell in response to the handover command; acquiring, at the mobile station (UE), a global cell ID, which can uniquely identify the second cell in at least one mobile communication system, from the handover command; and notifying, from the mobile station (UE) to the location information management server, the acquired global cell ID which can uniquely identify the second cell.

10 Claims, 10 Drawing Sheets

(56) References Cited

OTHER PUBLICATIONS

Written Opinion from PCT/JP2009/052104 dated Apr. 14, 2009 (3 pages).

Office Action for Chinese Application No. 200980104666.9, mailed Nov. 22, 2012, with English translations thereof (23 pages).

Notice of Grounds for Rejection for Japanese Application No. 2009-552552 dated Feb. 26, 2013, with English translation thereof (4 pages).

* cited by examiner

LOCATION INFORMATION ACQUISITION METHOD AND MOBILE STATION

TECHNICAL FIELD

The present invention relates to a location information acquisition method and a mobile station which enable a location information management server to acquire location information on the mobile station performing a specific communication.

BACKGROUND ART

In the 3GPP Working Group "SA2", discussion is made on positioning methods for the "Location Based Service", which is a kind of a location information management service for a mobile station UE.

As such positioning methods, studied are the "C-plane based positioning" performed via a C-plane established between a mobile station UE and a GMLC (Gateway Mobile Location Center) sever, the "U-plane based positioning" performed via a U-plane established between a mobile station UE and an SUPL (Secure User Plane Location) sever, and the like, for example, as shown in FIGS. 10 and 11.

Additionally, concrete specifications of the "U-plane based positioning" using an SUPL sever as described above are formulated by the OMA (Open Mobile Alliance).

In the "U-plane based positioning", a mobile station UE equipped with a GPS (Global Positioning System) positioning function is configured to report a GPS positioning result to an SUPL server via a U-plane established between itself and the SUPL server, and the SUPL server is configured to compute location information on the mobile station UE Here, assumable examples of the "Location Based Service" include an emergency call service and a service for lawful interception by a police agency or the like.

Note that, in such a service, when the mobile station UE is unable to report location information itself on the mobile station UE, the mobile station UE is required to at least report a global cell ID of a radio base station eNB to which the mobile station UE is connected.

However, the "U-plane based positioning" using an SUPL server has a problem that the SUPL server cannot acquire a global cell ID of a cell under control of the radio base station eNB to which the mobile station UE is connected.

More specifically, in the "U-plane based positioning" using an SUPL server, the mobile station UE is only aware of an ID (a scrambling code) of a cell where the mobile station UE is "camped" on, or of a cell where the UE performs "idle-to-active" transition. For this reason, there is a problem that, if the mobile station UE moves, at the start of SUPL positioning, from a cell where the mobile station UE is previously "camped on" or from a cell where the UE performed "idle-to-active" transition, the mobile station UE is unable to inform, to the SUPL server, a global cell ID of a cell under control of a radio base station eNB to which the mobile station is currently connected.

DISCLOSURE OF THE INVENTION

Consequently, the present invention is made in consideration of the above described problem, and an object thereof is to provide a location information acquisition method and a mobile station which make it possible to acquire, as location information on the mobile station UE, a global cell ID of a cell under control of a radio base station eNB to which the mobile station UE is currently connected.

A first aspect of the present invention is summarized as a location information acquisition method by which a location information management server acquires location information on a mobile station, including the steps of: transmitting, from a first radio base station to the mobile station communicating via a first cell under control of the first radio base station, a handover command instructing to perform handover to a second cell under control of a second radio base station; performing, at the mobile station, handover from the first cell to the second cell in response to the handover command; acquiring, at the mobile station, a global cell ID, which can uniquely identify the second cell in at least one mobile communication system, from the handover command; and notifying, from the mobile station to the location information management server, the acquired global cell ID which can uniquely identify the second cell.

A second aspect of the present invention is summarized as a location information acquisition method by which a location information management server acquires location information on a mobile station, including the steps of: transmitting, from a first radio base station to the mobile station communicating via a first cell under control of the first radio base station, a handover command instructing to perform handover to a second cell under control of a second radio base station; performing, at the mobile station, handover from the first cell to the second cell in response to the handover command; transmitting, from the mobile station to the second radio base station, a handover completion report notifying that handover from the first cell to the second cell is completed; notifying, from the second radio base station to the mobile station, a global cell ID which can uniquely identify the second cell in at least one mobile communication system, after receiving the handover completion report; and notifying, from the mobile station to the location information management server, the notified global cell ID which can uniquely identify the second cell.

A third aspect of the present invention is summarized as a location information acquisition method by which a location information management server acquires location information on a mobile station, including the steps of: measuring, at the mobile station communicating via a first cell under control of a first radio base station, a reception quality of a pilot signal in the first cell and a reception quality of a pilot signal in a second cell under control of a second radio base station; receiving, at the mobile station, broadcast information in the second cell, when the reception quality of the pilot signal in the second cell is higher than the reception quality of the pilot signal in the first cell; acquiring, at the mobile station, a global cell ID, which can uniquely identify the second cell in at least one mobile communication system, from the broadcast information; reporting, from the mobile station to the first radio base station, results of the measurement of the reception qualities of the pilot signals in the first cell and the second cell; transmitting, from the first radio base station to the mobile station, a handover command instructing to perform handover to the second cell; performing, at the mobile station, handover from the first cell to the second cell in response to the handover command; and notifying, from the mobile station to the location information management server, the global cell ID which can uniquely identify the second cell.

A fourth aspect of the present invention is summarized as a location information acquisition method by which a location information management server acquires location information on a mobile station, including the steps of: transmitting, from a first radio base station to the mobile station communicating via a first cell under control of the first radio base station, a handover command instructing to perform handover to a second cell under control of a second radio base station; performing handover by the mobile station from the first cell to the second cell in response to the handover command; transmitting a handover completion report from the mobile station to the second radio base station, the handover completion report notifying that handover from the first cell to the second cell is completed; receiving, at the mobile station, broadcast information on the second cell after transmitting the handover completion report; acquiring, at the mobile station, a global cell ID which can uniquely identify the second cell in at least one mobile communication system, from the broadcast information; and notifying, from the mobile station to the location information management server, the acquired global cell ID which can uniquely identify the second cell.

A fifth aspect of the present invention is summarized as a location information acquisition method by which a location information management server acquires location information on a mobile station, including the steps of: instructing, from the location information management server to the mobile station, to notify the location information management server of location information on the mobile station, when starting positioning of the mobile station; acquiring, at the mobile station, a global cell ID which can uniquely identify a cell in at least one mobile communication system, from a radio base station, in response to the instruction from the location information management server; and notifying, from the mobile station to the location information management server, the acquired global cell ID which can uniquely identify the cell.

A sixth aspect of the present invention is summarized as a mobile station configured to notify a location information management server of location information, including: a handover processor unit configured to perform handover from a first cell under control of a first radio base station to a second cell under control of a second radio base station, in accordance with a handover command instructing to perform handover to the second cell, when the mobile station receives the handover command while communicating via the first cell; a global cell ID acquisition unit configured to acquire a global cell ID which can uniquely identify the second cell in at least one mobile communication system, from the handover command; and a global cell ID notification unit configured to notify the location information management server of the acquired global cell ID which can uniquely identify the second cell.

A seventh aspect of the present invention is summarized as a mobile station configured to notify a location information management server of location information, including: a handover processor unit configured to perform handover from a first cell under control of a first radio base station to a second cell under control of a second radio base station, in accordance with a handover command instructing to perform handover to the second cell, when the mobile station receives the handover command while communicating via the first cell, and then to transmit a handover completion report to a second radio base station, the handover completion report notifying that handover from the first cell to the second cell is completed; a global cell ID acquisition unit configured to acquire a global cell ID, which can uniquely identify the second cell in at least one mobile communication system, through notification by the second radio base station having received the handover completion report; and a global cell ID notification unit configured to notify the location information management server of the acquired global cell ID which can uniquely identify the second cell.

A eighth aspect of the present invention is summarized as a mobile station configured to notify a location information management server of location information, including: a handover processor unit configured to measure a reception quality of a pilot signal in a first cell and a reception quality of a pilot signal in a second cell under control of a second radio base station, to report measurement results of the reception qualities of the pilot signals in the first cell and the second cell to a first radio base station, and then to perform handover from the first cell to the second cell in accordance with a handover command, which instructs to perform handover to the second cell upon receiving the handover command from the first radio base station, while the mobile station communicates via the first cell under control of the first radio base station; a global cell ID acquisition unit configured to receive broadcast information on the second cell when the reception quality of the pilot signal in the second cell is higher than the reception quality of the pilot signal in the first cell, and then to acquire a global cell ID from the broadcast information, the global cell ID making the second cell uniquely identifiable in at least one mobile communication system; and a global cell ID notification unit configured to notify the location information management server of the global cell ID which can uniquely identify the second cell.

A ninth aspect of the present invention is summarized as a mobile station configured to notify a location information management server of location information, including: a handover processor unit configured to perform handover from a first cell under control of a first radio base station to a second cell in accordance with a handover command, when the mobile station receives the handover command while communicating via the first cell, and then to transmit a handover completion report to a second radio base station, the handover command instructing to perform handover to the second cell, the handover completion report notifying that handover from the first cell to the second cell is completed; a global cell ID acquisition unit configured to receive broadcast information on the second cell after transmitting the handover completion report, and then to acquire a global cell ID, which can uniquely identify the second cell in at least one mobile communication system, from the broadcast information; and a global cell ID notification unit configured to notify the location information management server of the acquired global cell ID which can uniquely identify the second cell.

A tenth aspect of the present invention is summarized as a mobile station configured to notify a location information management server of location information, including: a global cell ID acquisition unit configured to acquire a global cell ID, which can uniquely identify a cell in at least one mobile communication system, from a radio base station in response to the instruction from the location information management server, when the location information management server instructs to notify the information management server of location information on the mobile station, and when the location information management server starts positioning of the mobile station; and a global cell ID notification unit configured to notify the location information management server of the acquired global cell ID which can uniquely identify the second cell.

BEST MODE FOR CARRYING OUT THE INVENTION (Mobile Communication System According to First Embodiment of the Present Invention)

A mobile communication system according to a first embodiment of the present invention is described with reference to FIGS. 1 to 4.

Although a mobile communication system based on the LTE (Long Term Evolution) scheme is described as an example in this embodiment, the present invention is applicable also to mobile communication systems other than the described mobile communication system.

Figure 1:
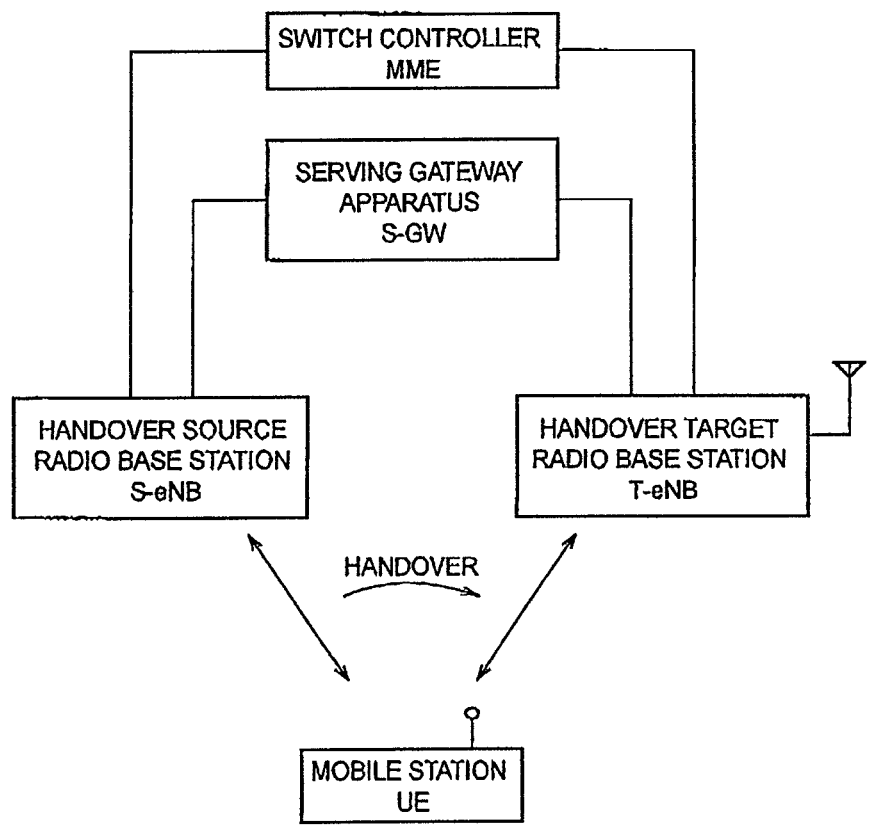
FIG. 1 is an entire configuration diagram of a mobile communication system according to a first embodiment of the present invention.

As shown in FIG. 1, described in this embodiment is an example of a case where a mobile station UE, performing communication for the "Location Based Service" via a first cell (a handover source cell) under control of a handover source radio base station (a first radio base station) S-eNB, performs handover (X2 handover or Inter-eNB handover). The handover is performed from the first cell under control of the handover source radio base station S-eNB to a second cell (a handover target cell) under control of a handover target radio base station (a second radio base station) T-eNB.

Figure 2:
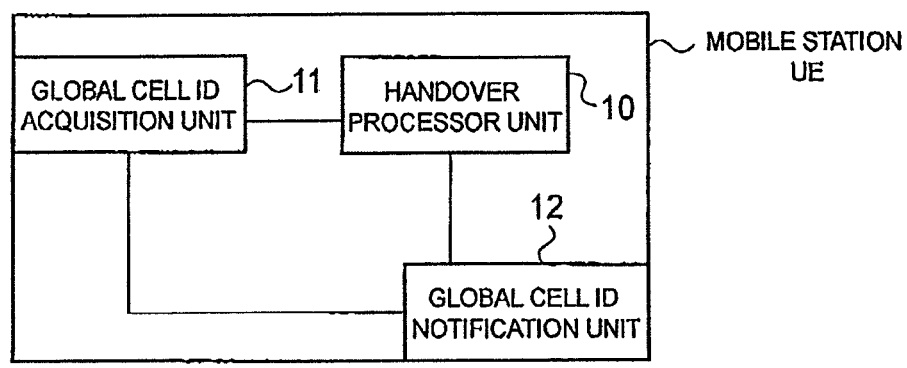
FIG. 2 is a functional block diagram of a mobile station according to the first embodiment of the present invention.

As shown in FIG. 2, a mobile station UE according to this embodiment includes a handover processor unit 10, a global cell ID acquisition unit 11 and a global cell ID notification unit 12.

The handover processor unit 10 is configured to measure a reception quality of a pilot signal in the first cell and a reception quality of a pilot signal in a cell neighboring the first cell (for example, the second cell).

The handover processor unit 10 is configured to report measurement results of the reception qualities of the pilot signals in the first cell and the cell neighboring the first cell (for example, the second cell) to the handover source radio base station S-eNB ("2. Measurement Reports" in FIG. 4).

The handover processor unit 10 is configured to carry out handover (for example, X2 handover) from the first cell to the second cell in accordance with a handover command, upon receiving the handover command from the handover source radio base station S-eNB, the handover command instructing to perform handover to the second cell ("7. Handover Command" in FIG. 4).

The handover processor unit 10 is configured to transmit a handover completion report to the handover target radio base station T-eNB, the handover completion report notifying that handover from the first cell to the second cell is completed ("11. Handover Confirm" in FIG. 4).

The global cell ID acquisition unit 11 is configured to acquire a global cell ID which can uniquely identify the second cell, which is under control of the handover target radio base station, in multiple mobile communication systems.

Note that, since there is a possibility that the same cell ID is used within one mobile communication system, the global cell ID may be composed of a "radio base station ID" and a "cell ID (scrambling code)", for example.

Additionally, if a shared network is taken into consideration, there is a possibility that the same radio base station ID is used within different mobile communication systems. Therefore, the global cell ID may be composed of a "PLMN (Public Land Mobile Network)-ID", a "radio base station ID" and a "cell ID (scrambling code)", for example.

Specifically, the global cell ID acquisition unit 11 may be configured to acquire the global cell ID from the handover command ("7. Handover Command" in FIG. 4) received from the handover source radio base station S-eNB.

Alternatively, the global cell ID acquisition unit 11 may be configured to acquire the global cell ID through notification by the handover target radio base station T-eNB having received the handover completion report ("11. Handover Confirm" in FIG. 4).

Alternatively, the global cell ID acquisition unit 11 may be configured to receive broadcast information (a BCCH: Broadcast Control Channel) on the second cell and acquire the global cell ID contained in this broadcast information, if the reception quality of the pilot signal in the second cell is higher than the reception quality of the pilot signal in the first cell.

Alternatively, the global cell ID acquisition unit 11 may be configured to receive the broadcast information on the second cell and acquire the global cell ID contained in this broadcast information, after transmitting the handover completion report ("11. Handover Confirm" in FIG. 4).

The global cell ID notification unit 12 is configured to notify an SUPL server (a location information management server) of the global cell ID acquired by the global cell ID acquisition unit 11.

For example, the global cell ID notification unit 12 may be configured to notify the SUPL server of the above global cell ID at timing designated by the SUPL server, or may be configured to notify the SUPL server of the above global cell ID every time the above global cell ID is acquired.

Figure 3:
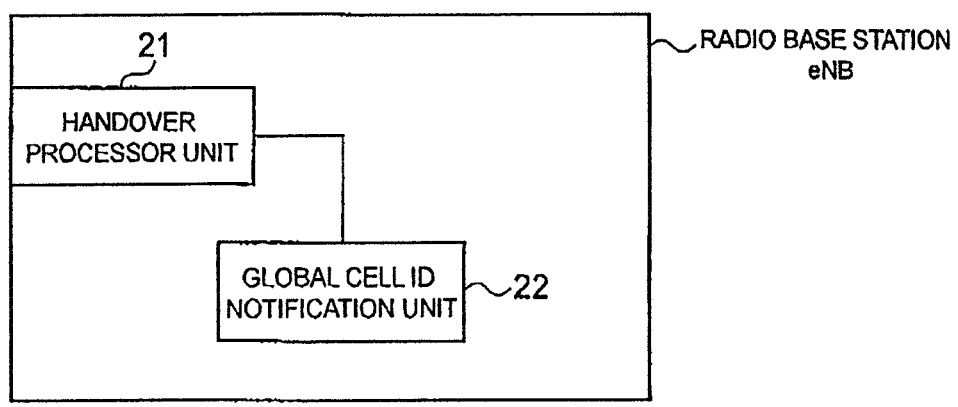
FIG. 3 is a functional block diagram of a radio base station according to the first embodiment of the present invention.
Figure 4:
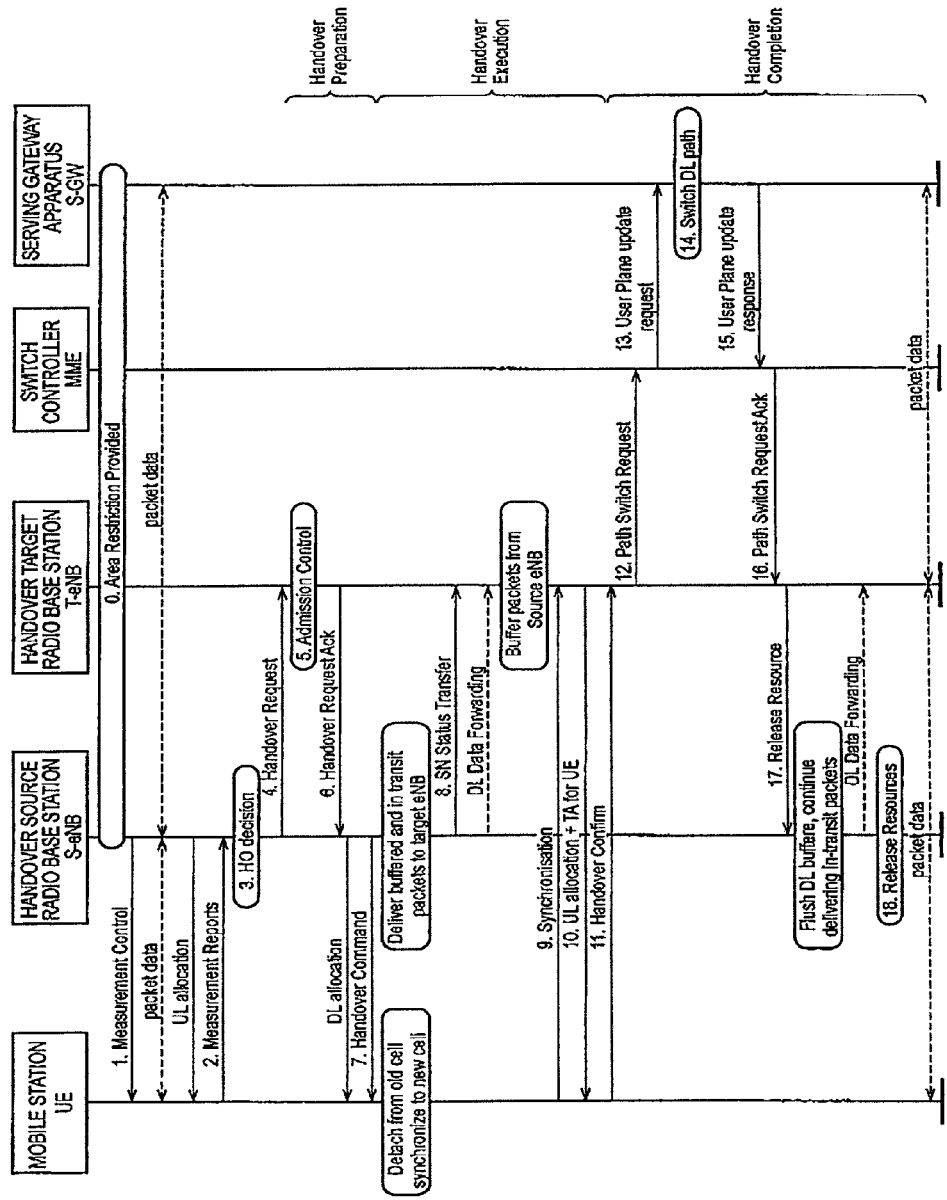
FIG. 4 is a sequence diagram illustrating an X2 handover procedure in the mobile communication system according to the first embodiment of the present invention.

As shown in FIG. 3, a radio base station eNB according to this embodiment includes a handover processor unit 21 and a global cell ID notification unit 22.

A handover processor unit 21 of the handover source radio base stations S-eNB is configured to determine according to the measurement results ("2. Measurement Reports" in FIG. 4) received from the mobile station UE whether or not the mobile station UE should perform handover.

The handover processor unit 21 of the handover source radio base station S-eNB is configured to transmit, when determining that the mobile station UE should perform handover, a handover command ("7. Handover Command" in FIG. 4) instructing to do so to the mobile station UE.

A handover processor unit 21 of the handover target radio base station T-eNB is configured to receive a handover completion report ("11. Handover Confirm" in FIG. 4) notifying that the mobile station UE completes handover from the first cell to the second cell.

The global cell ID notification unit 22 is configured to notify, to the mobile station UE, the global cell ID of the second cell under control of the handover target radio base station T-eNB.

Specifically, a global cell ID notification unit 22 of the handover source radio base station S-eNB is configured to notify, to the mobile station UE, the global cell ID of the second cell by including the global cell ID in the above described handover command ("7. Handover Command" in FIG. 4).

Alternatively, a global cell ID notification unit 22 of the handover target radio base station T-eNB may be configured to notify, to the mobile station UE, the global cell ID of the second cell after receiving the handover completion report ("11. Handover Confirm" in FIG. 4).

Additionally, the global cell ID notification unit 22 of the handover target radio base station T-eNB may be configured to notify, to the mobile station UE, the global cell ID of the second cell by including the global cell ID in the broadcast information on the second cell.

According to the mobile communication system of the first embodiment of the present invention, the mobile station UE is configured to acquire a global cell ID from the handover command ("7. Handover Command" in FIG. 4), and then to notify an SUPL server of the global cell ID. Accordingly, the SUPL server can acquire a global cell ID of a cell as location information on the mobile station UE, the cell being under control of a radio base station eNB to which the mobile station UE is connected after X2 handover is performed.

According to the mobile communication system of the first embodiment of the present invention, the mobile station UE is configured to acquire a global cell ID, of which the mobile station UE is notified by the handover target radio base station T-eNB, after transmitting the handover completion report ("11. Handover Confirm" in FIG. 4), and then to notify an SUPL server of the acquired global cell ID. Accordingly, the SUPL server can acquire the global cell ID of a cell as location information on the mobile station UE, the cell being under control of a radio base station eNB to which the mobile station UE is connected after X2 handover is performed.

According to the mobile communication system of the first embodiment of the present invention, the mobile station UE is configured to acquire a global cell ID from the broadcast information (a BCCH: Broadcast Control Channel) on the second cell if the reception quality of the pilot signal in the second cell is higher than the reception quality of the pilot signal in the first cell, and then to notify an SUPL server of the acquired global cell ID. Accordingly, the SUPL server can acquire the global cell ID of a cell as location information on the mobile station UE, the cell being under control of a radio base station eNB to which the mobile station UE is connected after X2 handover is performed.

According to the mobile communication system of the first embodiment of the present invention, the mobile station UE is configured to receive the broadcast information on the second cell after transmitting the handover completion report ("11. Handover Confirm" in FIG. 4) and acquire the global cell ID contained in this broadcast information, and then to notify an SUPL server of the acquired global cell ID. Accordingly, the SUPL server can acquire the global cell ID of a cell as location information on the mobile station UE, the cell being under control of a radio base station eNB to which the mobile station UE is connected after X2 handover is performed.

(Mobile Communication System According to Second Embodiment of the Present Invention)

A mobile communication system according to a second embodiment of the present invention is described with reference to FIGS. 5 and 6. The mobile communication system according to this embodiment is described below by focusing on differences from the above described first embodiment.

Figure 5:
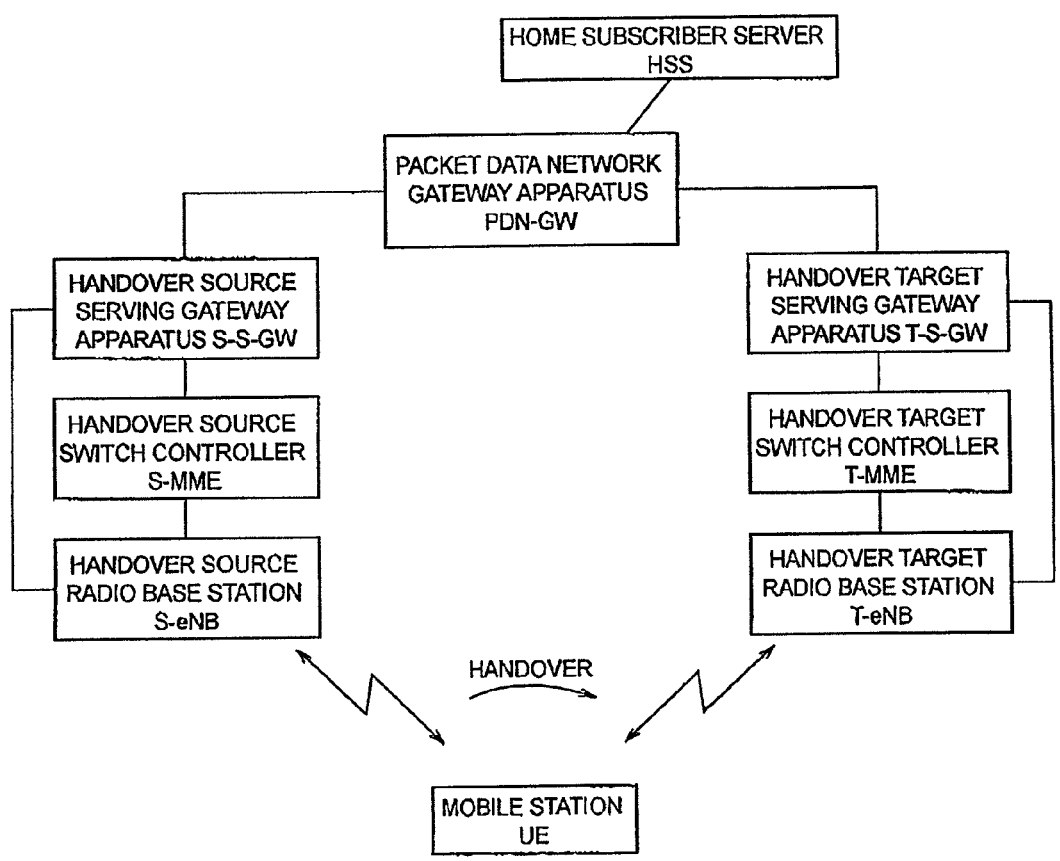
FIG. 5 is an entire configuration diagram of a mobile communication system according to a second embodiment of the present invention.
Figure 6:
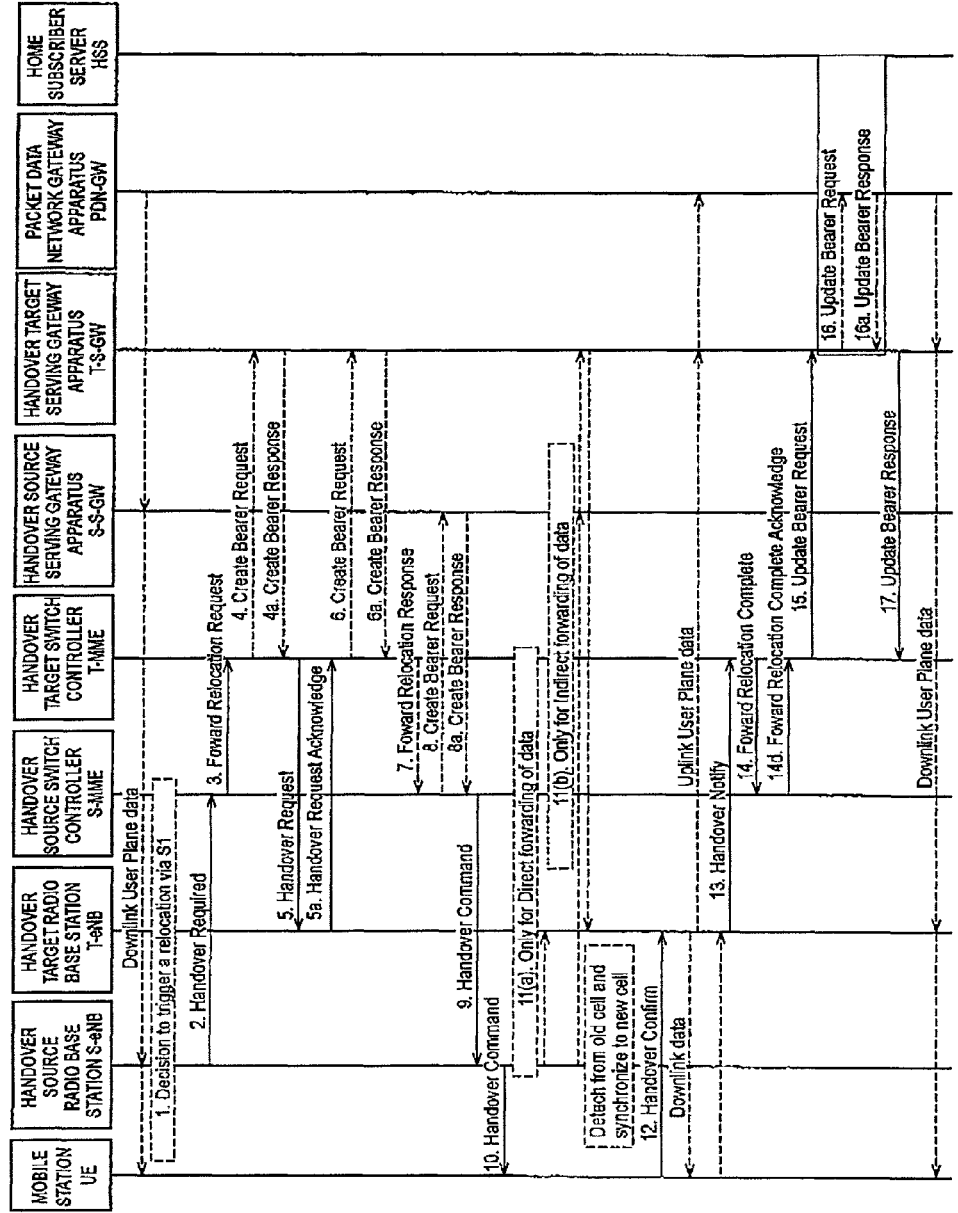
FIG. 6 is a sequence diagram illustrating an S1 handover procedure in the mobile communication system according to the second embodiment of the present invention.

As shown in FIG. 5, described in this embodiment is an example of a case where a mobile station UE, performing communication for a "Location Based Service" via a first cell (a handover source cell) under control of a handover source radio base station (a first radio base station) S-eNB, performs handover (S1 handover or Inter-eNB handover). The handover is performed from the first cell under control of the handover source radio base station S-eNB to a second cell being under control of a handover target radio base station (a second radio base station) T-eNB.

A global cell ID acquisition unit 11 of the mobile station UE may be configured to acquire a global cell ID from a handover command ("10. Handover Command" in FIG. 6) received from the handover source radio base station S-eNB.

Alternatively, the global cell ID acquisition unit 11 of the mobile station UE may be configured to acquire the global cell ID through notification by the handover target radio base station T-eNB having received the handover completion report ("12. Handover Confirm" in FIG. 6).

Alternatively, the global cell ID acquisition unit 11 of the mobile station UE may be configured to receive broadcast information on the second cell and acquire a global cell ID contained in this broadcast information, after transmitting a handover completion report ("12. Handover Confirm" in FIG. 6).

Further, a global cell ID notification unit 22 of the handover source radio base station S-eNB may be configured to notify, to the mobile station UE, a global cell ID of the second cell by including the global cell ID in the above described handover command ("10. Handover Command" in FIG. 6).

Further, a global cell ID notification unit 22 of the handover target radio base stations T-eNB may be configured to notify, to the mobile station UE, the global cell ID of the second cell after receiving the handover completion report ("12. Handover Confirm" in FIG. 6).

According to the mobile communication system of the second embodiment of the present invention, the mobile station UE is configured to acquire a global cell ID, of which the mobile station UE is notified by the handover target radio base station T-eNB, after transmitting the handover completion report ("12. Handover Confirm" in FIG. 6), and then to notify an SUPL server of the acquired global cell ID. Accordingly, the SUPL server can acquire the global cell ID of a cell as location information on the mobile station UE, the cell being under control of a radio base station eNB to which the mobile station UE is connected after S1 handover is performed.

According to the mobile communication system of the second embodiment of the present invention, the mobile station UE is configured to receive the broadcast information on the second cell after transmitting the handover completion report ("12. Handover Confirm" in FIG. 6) and acquire the global cell ID contained in this broadcast information, and then to notify an SUPL server of the acquired global cell ID. Accordingly, the SUPL server can acquire the global cell ID of a cell as location information on the mobile station UE, the cell being under control of a radio base station eNB to which the mobile station UE is connected after S1 handover is performed.

MODIFICATION EXAMPLE 1

In Modification Example 1 of the present invention, an SUPL server (a location information management server) is configured to instruct, when starting positioning of a mobile station UE, to notify the SUPL server of location information on a cell under control of a radio base station eNB to which the mobile station UE is connected.

A global cell ID acquisition unit 11 of the mobile station UE is configured to acquire a global cell ID of the cell in response to the above instruction from the SUPL server.

Specifically, the global cell ID acquisition unit 11 of the mobile station UE may be configured to receive, in response to the above instruction from the SUPL server, broadcast information on the cell and acquire a global cell ID of the cell contained in the broadcast information.

Alternatively, the global cell ID acquisition unit 11 of the mobile station UE may be configured to acquire, in response to the above instruction from the SUPL server, the global cell ID of the cell by requesting the radio base station eNB to transmit the global cell ID of the cell.

Alternatively, the global cell ID acquisition unit 11 of the mobile station UE may be configured to acquire, in response to the above instruction from the SUPL server, the global cell ID held in the mobile station UE through communication between protocols within the mobile station UE. The communication is made, for example, between an AS layer and an application layer.

Figure 7:
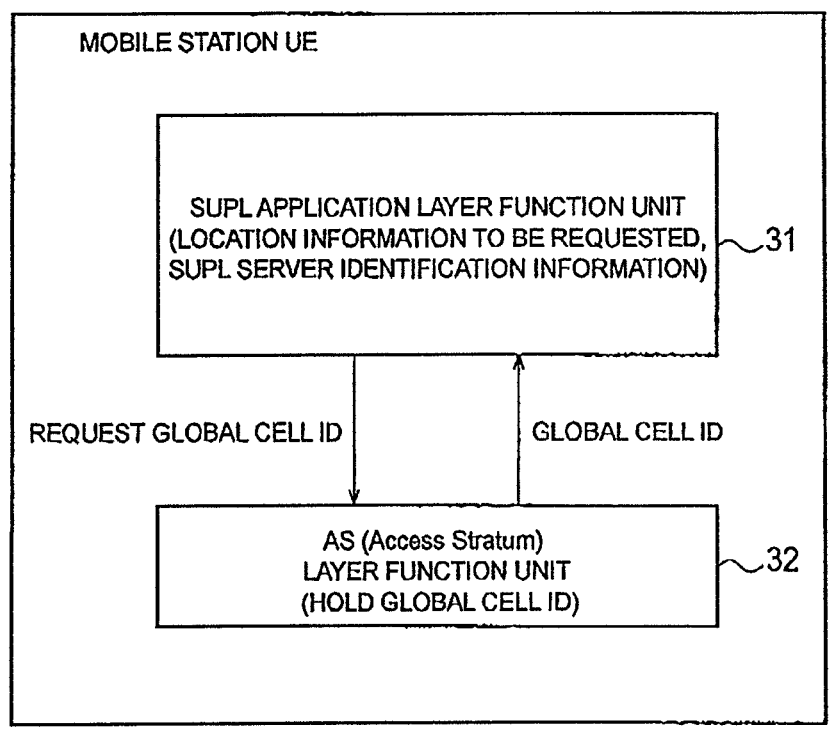
FIG. 7 is a functional block diagram of a mobile station according to Modification Example 1 of the present invention.

For example, as shown in FIG. 7, a mobile station UE according to Modification Example 1 includes an SUPL application layer function unit 31 and an AS layer function unit 32.

Here, when the mobile station UE is in an Idle state, the AS layer function unit 32 holds a global cell ID of a cell in which the mobile station UE most recently performed a standby operation.

On the other hand, when the mobile station UE is in an Active state, the AS layer function unit 32 holds a global cell ID of a serving cell.

Here, when the mobile station UE transitions from the Idle state to the Active state, the AS layer function unit 32 is configured to acquire and hold a global cell ID contained in broadcast information on the serving cell.

Further, when the mobile station UE performs handover, the AS layer function unit 32 is configured to acquire and hold a global cell ID contained in broadcast information on a handover target cell.

Hereinafter, with reference to FIGS. 8 and 9, a description will be given of operations performed by the SUPL server to acquire location information on the mobile station UE in a mobile communication system according to Modification Example 1.

Firstly, with reference to FIG. 8, a description will be given of operations performed by the SUPL server to acquire the location information by instructing the mobile station UE in the Idle state to report the location information in the mobile communication system according to Modification Example 1.

Figure 8:
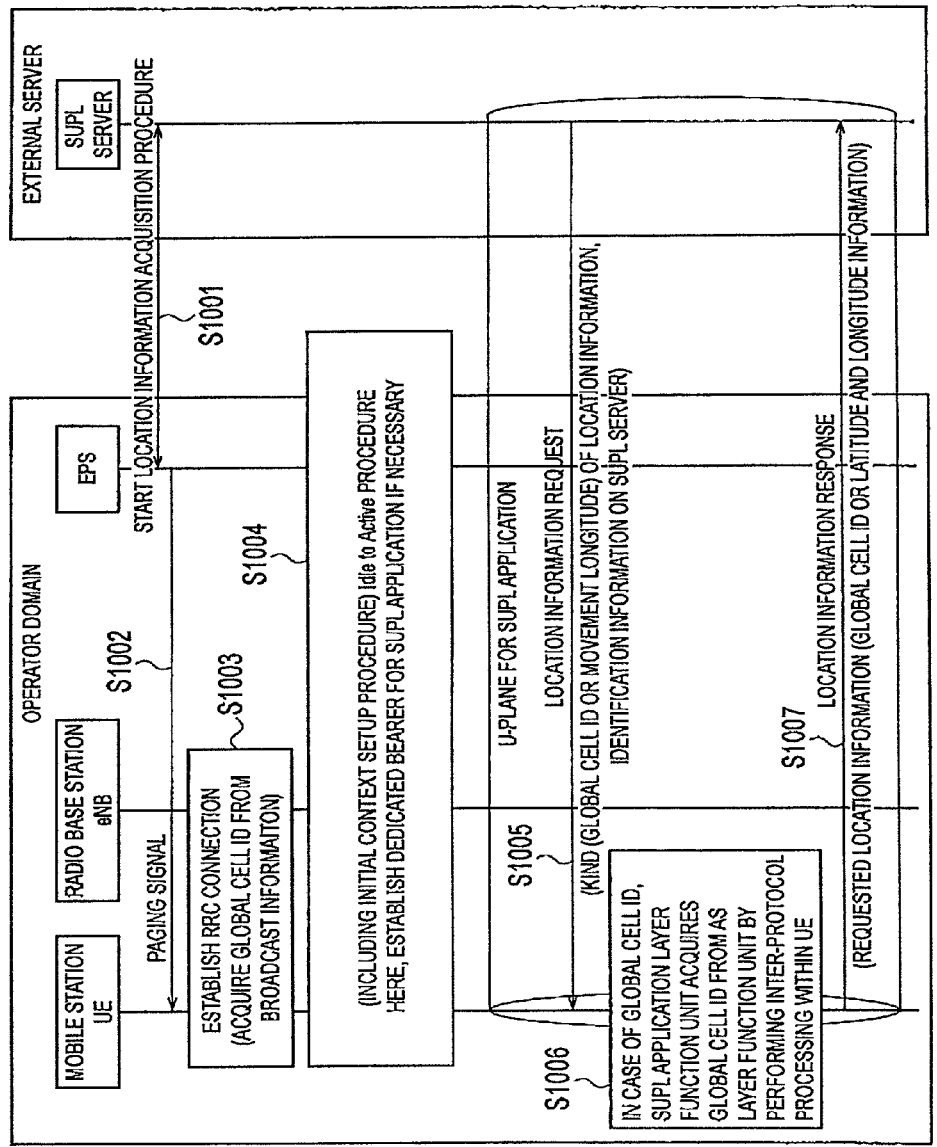
FIG. 8 is a sequence diagram illustrating operations of a mobile communication system according to Modification Example 1 of the present invention.

As shown in FIG. 8, a location information acquisition procedure is started between the SUPL server and an EPS (Evolved Packet System) in step S1001. Here, the EPS includes a switch controller MME, gateway apparatuses S-GW and P-GW, and the like.

In step S1002, the EPS transmits a paging signal to the mobile station UE.

In step S1003, in response to the above paging signal, the mobile station UE receives broadcast information on a cell in which the mobile station UE is performing a standby operation, and acquires a global cell ID contained in the received broadcast information. The mobile station UE then holds the global cell ID in the AS layer function unit 32 thereof.

Additionally, in step S1003, the mobile station UE establishes an RRC connection with a radio base station controlling the cell in which the mobile station UE is performing the standby operation. Then, in step S1004, the mobile station UE executes an "Idle to Active procedure" including an initial context setup procedure.

Note that the SUPL server may exist in a "Default PDN (an always-connected external network)", or in a PDN (Packet Data Network) other than the "Default PDN".

Here, if the SUPL server exists in a PDN other than the "Default PDN", the mobile station UE establishes a U-plane bearer for SUPL application with the PDN to which the SUPL server belongs.

In step S1005, the SUPL server transmits a location information request to the mobile station UE via the U-plane bearer for SUPL application, the location information request requesting to notify the SUPL server of the location information on the mobile station UE.

The location information request designates a kind (such as a global cell ID of a cell under control of a radio base station eNB to which the mobile station UE is connected) of the location information on the mobile station UE that the mobile station UE should notify the SUPL server, and also designates identification information on the SUPL server.

In step S1006, the SUPL application layer function unit 31 of the mobile station UE acquires the location information (the above described global cell ID) on the mobile station UE, as designated by the location information request, from the AS layer function unit 32 of the mobile station UE. Then, the SUPL application layer function unit 31 transmits a location information response to the SUPL server in step S1007, the location information response containing the location information on the mobile station UE and the identification information on the SUPL server as designated by the location information request.

Here, the location information on the mobile station UE may be latitude and longitude information associated with a location of the mobile station UE.

Secondly, with reference to FIG. 9, a description will be given of operations performed by the SUPL server to acquire the location information by instructing the mobile station UE in the Active state to report the location information in the mobile communication system according to Modification Example 1.

Figure 9:
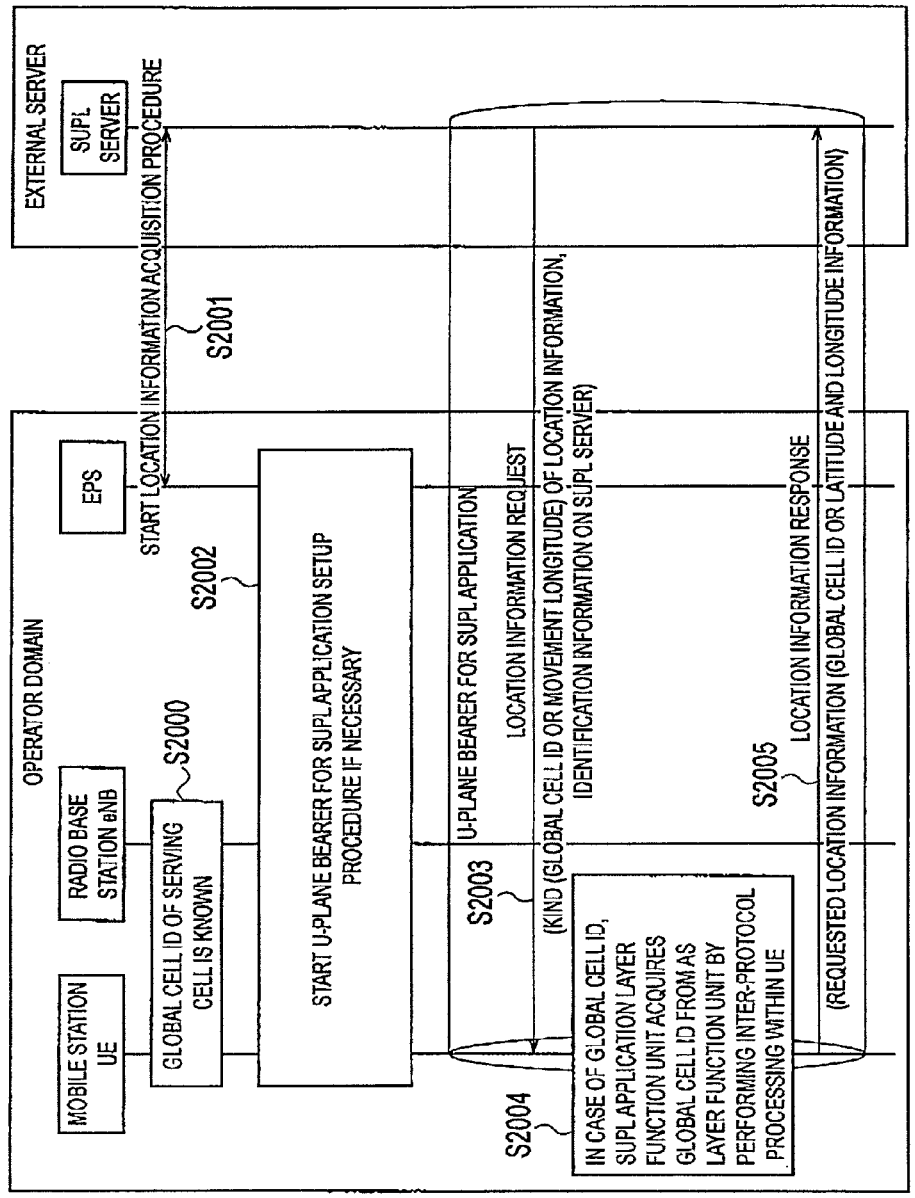
FIG. 9 is another sequence diagram illustrating operations of the mobile communication system according to Modification Example 1 of the present invention.
Figure 10:
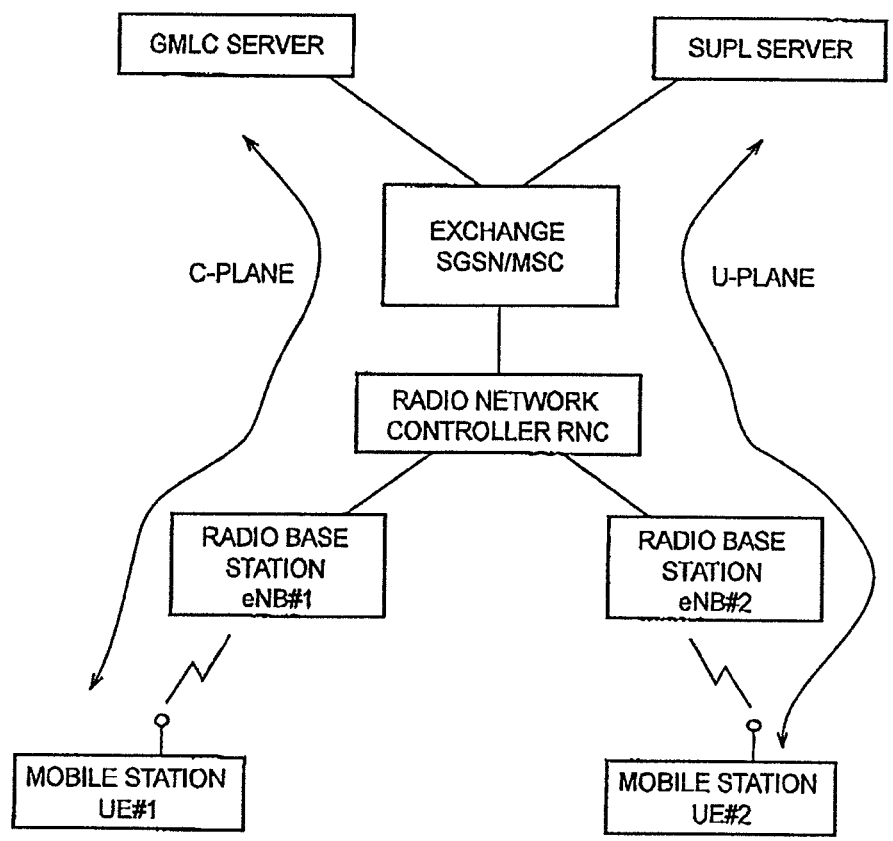
FIG. 10 is a diagram provided for explaining a problem in a conventional mobile communication system.
Figure 11:
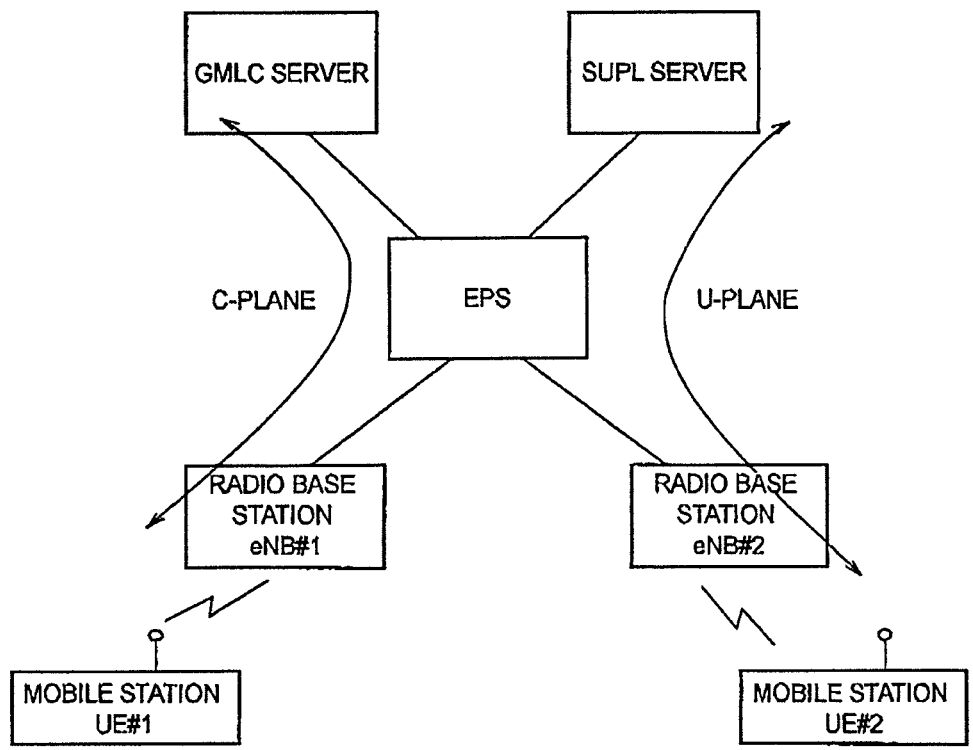
FIG. 11 is a diagram provided for explaining a problem in another conventional mobile communication system.

As shown in FIG. 9, in step 2000, the mobile station UE holds a global cell ID of a cell (a serving cell) under control of a radio base station eNB.

Here, when in the Active state, every time the broadcast information on the serving cell is changed, the mobile station UE receives a broadcast information change screen from the serving cell, receives broadcast information on the serving cell, acquires a global cell ID contained in the broadcast information, and holds the global cell ID in the AS layer function unit 32 of the mobile station UE.

In step 2001, the location information acquisition procedure is started between the SUPL server and the EPS.

In step S2002, a U-plane bearer for SUPL application setup procedure is started between the mobile station UE and the EPS.

Here, when the mobile station UE is in a state where U-plane data is transmittable to and receivable from the SUPL server, the U-plane bearer for SUPL application setup procedure is unnecessary.

In step S2003, the SUPL server transmits a location information request to the mobile station UE via a U-plane bearer for SUPL application, the location information request requesting the mobile station UE to notify the SUPL server of the location information on the mobile station UE.

The location information request designates a kind (such as a global cell ID of a cell under control of a radio base station eNB to which the mobile station is connected) of the location information on the mobile station UE that the mobile station UE should notify the SUPL server, and also designates identification information on the SUPL server.

In step S2004, the SUPL application layer function unit 31 of the mobile station UE acquires the location information (the above described global cell ID) on the mobile station UE, as designated by the location information request, from the AS layer function unit 32 of the mobile station UE. Then, the SUPL application layer function unit 31 transmits a location information response to the SUPL server in step S2005, the location information response containing the location information on the mobile station UE and the identification information on the SUPL server as designated by the location information request.

Here, the location information on the mobile station UE may be latitude and longitude information associated with a location of the mobile station UE.

MODIFICATION EXAMPLE 2

In the above embodiment, described is an example in which the first radio base station S-eNB is a base station different from the second radio base station T-eNB, that is, an example of performing Inter-eNB handover. However, the present invention is not limited by this example, and is applicable also to an example in which the first radio base station S-eNB is the same radio base station as the second radio base station T-eNB, that is, an example of performing Intra-eNB handover.

Note that operation of the above described mobile station UE, the radio base station eNB, the switch controller MME and the serving gateway apparatus S-GW may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB, the switch controller MME and the serving gateway apparatus S-GW. Also, the storage medium and the processor may be provided in the mobile station UE, the radio base station eNB, the switch controller MME and the serving gateway apparatus S-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention provides a location information acquisition method and a mobile station which make it possible to acquire a global cell ID of a cell as location information on the mobile station UE, the cell being under control of a radio base station eNB to which the mobile station UE is currently connected.

The invention claimed is:

1. A location information acquisition method by which a location information management server, which manages positioning of a mobile station via a U-Plane based positioning using a global positioning system, acquires location information on the mobile station, comprising the steps of:

transmitting, from a first radio base station to the mobile station communicating via a first cell under control of the first radio base station, a handover command instructing to perform handover to a second cell under control of a second radio base station;

performing, at the mobile station, handover from the first cell to the second cell in response to the handover command;

acquiring, at the mobile station, a global cell ID, which can uniquely identify the second cell in at least one mobile communication system, from the handover command; and notifying, from the mobile station to the location information management server, the acquired global cell ID which can uniquely identify the second cell, even though the location information management server manages the positioning of the mobile station via the U-Plane based positioning using the global positioning system.

2. A location information acquisition method by which a location information management server, which manages positioning of a mobile station via a U-Plane based positioning using a global positioning system, acquires location information on the mobile station, comprising the steps of:

transmitting, from a first radio base station to the mobile station communicating via a first cell under control of the first radio base station, a handover command instructing to perform handover to a second cell under control of a second radio base station;

performing, at the mobile station, handover from the first cell to the second cell in response to the handover command;

transmitting, from the mobile station to the second radio base station, a handover completion report notifying that handover from the first cell to the second cell is completed;

notifying, from the second radio base station to the mobile station, a global cell ID which can uniquely identify the second cell in at least one mobile communication system, after receiving the handover completion report; and notifying, from the mobile station to the location information management server, the notified global cell ID which can uniquely identify the second cell, even though the location information management server manages the positioning of the mobile station via the U-Plane based positioning using the global positioning system.

3. A location information acquisition method by which a location information management server, which manages positioning of a mobile station via a U-Plane based positioning using a global positioning system, acquires location information on the mobile station, comprising the steps of:

measuring, at the mobile station communicating via a first cell under control of a first radio base station, a reception quality of a pilot signal in the first cell and a reception quality of a pilot signal in a second cell under control of a second radio base station;

receiving, at the mobile station, broadcast information in the second cell, when the reception quality of the pilot signal in the second cell is higher than the reception quality of the pilot signal in the first cell;

acquiring, at the mobile station, a global cell ID, which can uniquely identify the second cell in at least one mobile communication system, from the broadcast information;

reporting, from the mobile station to the first radio base station, results of the measurement of the reception qualities of the pilot signals in the first cell and the second cell;

transmitting, from the first radio base station to the mobile station, a handover command instructing to perform handover to the second cell;

performing, at the mobile station, handover from the first cell to the second cell in response to the handover command; and notifying, from the mobile station to the location information management server, the notified global cell ID which can uniquely identify the second cell, even though the location information management server manages the positioning of the mobile station via the U-Plane based positioning using the global positioning system.

4. A location information acquisition method by which a location information management server, which manages positioning of a mobile station via a U-Plane based positioning using a global positioning system, acquires location information on the mobile station, comprising the steps of:

transmitting, from a first radio base station to the mobile station communicating via a first cell under control of the first radio base station, a handover command instructing to perform handover to a second cell under control of a second radio base station;

performing handover by the mobile station from the first cell to the second cell in response to the handover command;

transmitting a handover completion report from the mobile station to the second radio base station, the handover completion report notifying that handover from the first cell to the second cell is completed;

receiving, at the mobile station, broadcast information on the second cell after transmitting the handover completion report;

acquiring, at the mobile station, a global cell ID which can uniquely identify the second cell in at least one mobile communication system, from the broadcast information; and notifying, from the mobile station to the location information management server, the acquired global cell ID which can uniquely identify the second cell, even though the location information management server manages the positioning of the mobile station via the U-Plane based positioning using the global positioning system.

5. A location information acquisition method by which a location information management server, which manages positioning of a mobile station via a U-Plane based positioning using a global positioning system, acquires location information on the mobile station, comprising the steps of:

instructing, from the location information management server to the mobile station, to notify the location information management server of location information on the mobile station, when starting positioning of the mobile station;

acquiring, at the mobile station, a global cell ID which can uniquely identify a cell in at least one mobile communication system, from a radio base station, in response to the instruction from the location information management server; and notifying, from the mobile station to the location information management server, the acquired global cell ID which can uniquely identify the cell, even though the location information management server manages the positioning of the mobile station via the U-Plane based positioning using the global positioning system.

6. A mobile station configured to notify a location information management server of location information, the location information management server managing positioning of the mobile station via a U-Plane based positioning using a global positioning system, comprising:

a handover processor unit configured to perform handover from a first cell under control of a first radio base station to a second cell under control of a second radio base station, in accordance with a handover command instructing to perform handover to the second cell, when the mobile station receives the handover command while communicating via the first cell;

a global cell ID acquisition unit configured to acquire a global cell ID which can uniquely identify the second cell in at least one mobile communication system, from the handover command; and a global cell ID notification unit configured to notify the location information management server of the acquired global cell ID which can uniquely identify the second cell, even though the location information management server manages the positioning of the mobile station via the U-Plane based positioning using the global positioning system.

7. A mobile station configured to notify a location information management server of location information, the location information management server managing positioning of the mobile station via a U-Plane based positioning using a global positioning system, comprising:

a handover processor unit configured to perform handover from a first cell under control of a first radio base station to a second cell under control of a second radio base station, in accordance with a handover command instructing to perform handover to the second cell, when the mobile station receives the handover command while communicating via the first cell, and then to transmit a handover completion report to a second radio base station, the handover completion report notifying that handover from the first cell to the second cell is completed;

a global cell ID acquisition unit configured to acquire a global cell ID, which can uniquely identify the second cell in at least one mobile communication system, through notification by the second radio base station having received the handover completion report; and a global cell ID notification unit configured to notify the location information management server of the acquired global cell ID which can uniquely identify the second cell, even though the location information management server manages the positioning of the mobile station via the U-Plane based positioning using the global positioning system.

8. A mobile station configured to notify a location information management server of location information, the location information management server managing positioning of the mobile station via a U-Plane based positioning using a global positioning system, comprising:

a handover processor unit configured to measure a reception quality of a pilot signal in a first cell and a reception quality of a pilot signal in a second cell under control of a second radio base station, to report measurement results of the reception qualities of the pilot signals in the first cell and the second cell to a first radio base station, and then to perform handover from the first cell to the second cell in accordance with a handover command, which instructs to perform handover to the second cell upon receiving the handover command from the first radio base station, while the mobile station communicates via the first cell under control of the first radio base station;

a global cell ID acquisition unit configured to receive broadcast information on the second cell when the reception quality of the pilot signal in the second cell is higher than the reception quality of the pilot signal in the first cell, and then to acquire a global cell ID from the broadcast information, the global cell ID making the second cell uniquely identifiable in at least one mobile communication system; and a global cell ID notification unit configured to notify the location information management server of the global cell ID which can uniquely identify the second cell, even though the location information management server manages the positioning of the mobile station via the U-Plane based positioning using the global positioning system.

9. A mobile station configured to notify a location information management server of location information, the location information management server managing positioning of the mobile station via a U-Plane based positioning using a global positioning system, comprising:

a handover processor unit configured to perform handover from a first cell under control of a first radio base station to a second cell in accordance with a handover command, when the mobile station receives the handover command while communicating via the first cell, and then to transmit a handover completion report to a second radio base station, the handover command instructing to perform handover to the second cell, the handover completion report notifying that handover from the first cell to the second cell is completed;

a global cell ID acquisition unit configured to receive broadcast information on the second cell after transmitting the handover completion report, and then to acquire a global cell ID, which can uniquely identify the second cell in at least one mobile communication system, from the broadcast information; and a global cell ID notification unit configured to notify the location information management server of the acquired global cell ID which can uniquely identify the second cell, even though the location information management server manages the positioning of the mobile station via the U-Plane based positioning using the global positioning system.

10. A mobile station configured to notify a location information management server of location information, the location information management server managing positioning of the mobile station via a U-Plane based positioning using a global positioning system, comprising:

a global cell ID acquisition unit configured to acquire a global cell ID, which can uniquely identify a cell in at least one mobile communication system, from a radio base station in response to the instruction from the location information management server, when the location information management server instructs to notify the information management server of location information on the mobile station, and when he location information management server starts positioning of the mobile station; and a global cell ID notification unit configured to notify the location information management server of the acquired global cell ID which can uniquely identify the second cell, even though the location information management server manages the positioning of the mobile station via the U-Plane based positioning using the global positioning system.

* * * * *